US008559516B2

(12) United States Patent  
Hardacker et al.

(10) Patent No.: US 8,559,516 B2
(45) Date of Patent: *Oct. 15, 2013

(54) VIDEO SEQUENCE ID BY DECIMATED SCENE SIGNATURE

(75) Inventors: Robert L. Hardacker, Escondido, CA (US); Christopher Jensen Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1424 days.

This patent is subject to a terminal disclaimer.

(21) Appl. No.: 11/818,375

(22) Filed: Jun. 14, 2007

(65) Prior Publication Data

US 2008/0309819 A1 Dec. 18, 2008

(51) Int. Cl.
*H04N 7/26* (2006.01)

(52) U.S. Cl.
USPC ...................................... 375/240.16

(58) Field of Classification Search
USPC ...................... 375/240.16; 348/700
See application file for complete search history.

(56) References Cited

U.S. PATENT DOCUMENTS

| | | | | |
|---|---|---|---|---|
| 5,247,357 | A * | 9/1993 | Israelsen | 375/240.12 |
| 5,504,518 | A * | 4/1996 | Ellis et al. | 725/22 |
| 6,185,363 | B1 | 2/2001 | Dimitrova et al. | |
| 6,466,670 | B1 * | 10/2002 | Tsuria et al. | 380/202 |
| 6,507,615 | B1 | 1/2003 | Tsujii et al. | |
| 6,721,488 | B1 | 4/2004 | Dimitrova et al. | |
| 7,671,924 | B2 | 3/2010 | Chao et al. | |
| 7,793,318 | B2 * | 9/2010 | Deng | 725/19 |
| 7,921,296 | B2 * | 4/2011 | Haitsma et al. | 713/180 |
| 2002/0191112 | A1 | 12/2002 | Akiyoshi et al. | |
| 2003/0086496 | A1 | 5/2003 | Zhang et al. | |
| 2003/0090505 | A1 * | 5/2003 | McGee et al. | 345/721 |
| 2005/0172312 | A1 | 8/2005 | Lienhart et al. | |
| 2005/0204398 | A1 | 9/2005 | Ryal | |
| 2006/0048191 | A1 * | 3/2006 | Xiong | 725/52 |

(Continued)

FOREIGN PATENT DOCUMENTS

WO WO 2007/066924 6/2007

OTHER PUBLICATIONS

Job Oostveen, Ton Kalker, and Jaap Haitsma; "Feature Extraction and a Database Strategy for Video Fingerprinting," SpringerLink website, 2002.

(Continued)

*Primary Examiner* — Mehrdad Dastouri
*Assistant Examiner* — Mohammed Rahaman
(74) *Attorney, Agent, or Firm* — Miller Patent Services; Jerry A. Miller

(57) ABSTRACT

A method for identifying video content consistent with certain embodiments involves, selecting a plurality pixels using a pixel selection algorithm, the pixels being selected to provide a repeatable selection of pixels in a selected frame in the video content; establishing a scene signature by: extracting a characteristic of each selected pixel that can be represented in a digital form for each pixel, and generating a digital stream by concatenating the digital form for the extracted characteristic of each pixel; transmitting the scene signature to an identification device for comparison with scene signatures in a database having a plurality of video content items to identify the video content; and receiving either the identification of the video content or an indication that no video content is uniquely identified by the scene signature. This abstract is not to be considered limiting, since other embodiments may deviate from the features described in this abstract.

32 Claims, 3 Drawing Sheets

(56) References Cited

U.S. PATENT DOCUMENTS

| | | | |
|---|---|---|---|
| 2006/0059510 A1 | 3/2006 | Huang et al. | |
| 2006/0165283 A1* | 7/2006 | DeWitt et al. | 382/173 |
| 2006/0271947 A1 | 11/2006 | Lienhart et al. | |
| 2007/0107022 A1* | 5/2007 | Lawrence, III | 725/92 |
| 2008/0239159 A1 | 10/2008 | Read et al. | |
| 2008/0313152 A1* | 12/2008 | Yoon et al. | 707/3 |

OTHER PUBLICATIONS

Chung Wing Ng, Irwin King, and Michael R. Lyu; "Video Comparison Using Tree Matching Algorithms," Department of Computer Science and Engineering, The Chinese University of Hong Kong, 2002.

Rainer Lienhart, Wolfgang Effelsberg and Ramesh Jain; "VisualGREP: A Systematic Method to Compare and Retrieve Video Sequences," SPIE vol. 3312, 1998.

G. Ahanger and T.D.C. Little; "A Survey of Technologies for Parsing and Indexing Digital Video," Multimedia Communication Laboratory, Department of Electrical, Computer and Systems Engineering; Boston University, 1995.

Hampapur, Arun et al., Comparison of Sequence Matching Techniques for Video Copy Detection Mode, Proceedings of the SPIE Conference on Storage and Retrieval for Media Databases, San Jose, CA, USA, 2002. 8 pages.

Indk, Piotr, et al., Finding Pirated Video Sequences on the Internet, Paper No. 199, Stanford Infolab Technical Report, Feb. 1999, pp. 1-24.

Non-Final Office Action for U.S. Appl. No. 11/692,166, Mar. 15, 2011.

Henry, James, Response to Non-Final Office Action (U.S. Appl. No. 11/692,166), Jul. 15, 2011.

Final Office Action for U.S. Appl. No. 11/692,166, Nov. 1, 2011.

Henry, James, Response to Final Office Action (U.S. Appl. No. 11/692,166), Feb. 1, 2012.

Non-Final Office Action for U.S. Appl. No. 11/692,166, Jun. 13, 2012.

Henry, James, Response to Non-Final Office Action (U.S. Appl. No. 11/692,166), Sep. 13, 2012.

Final Office Action for U.S. Appl. No. 11/692,166, Dec. 13, 2012.

\* cited by examiner

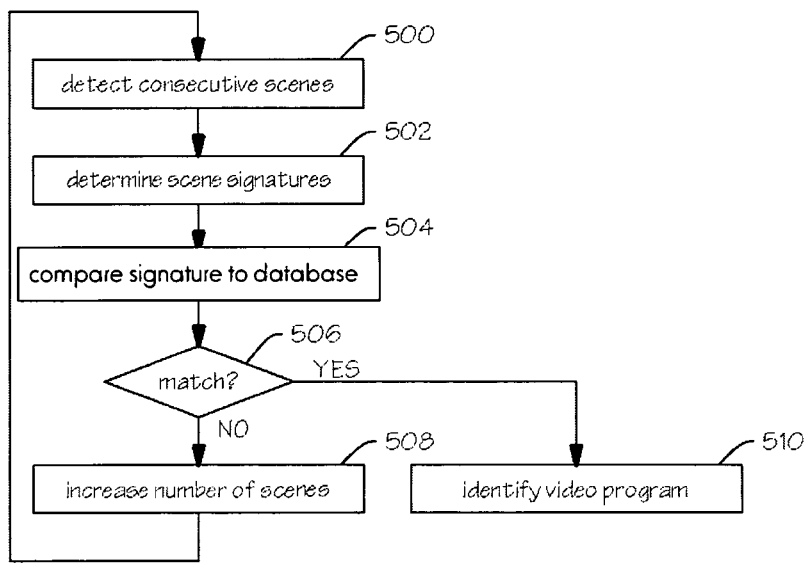
FIG. 5
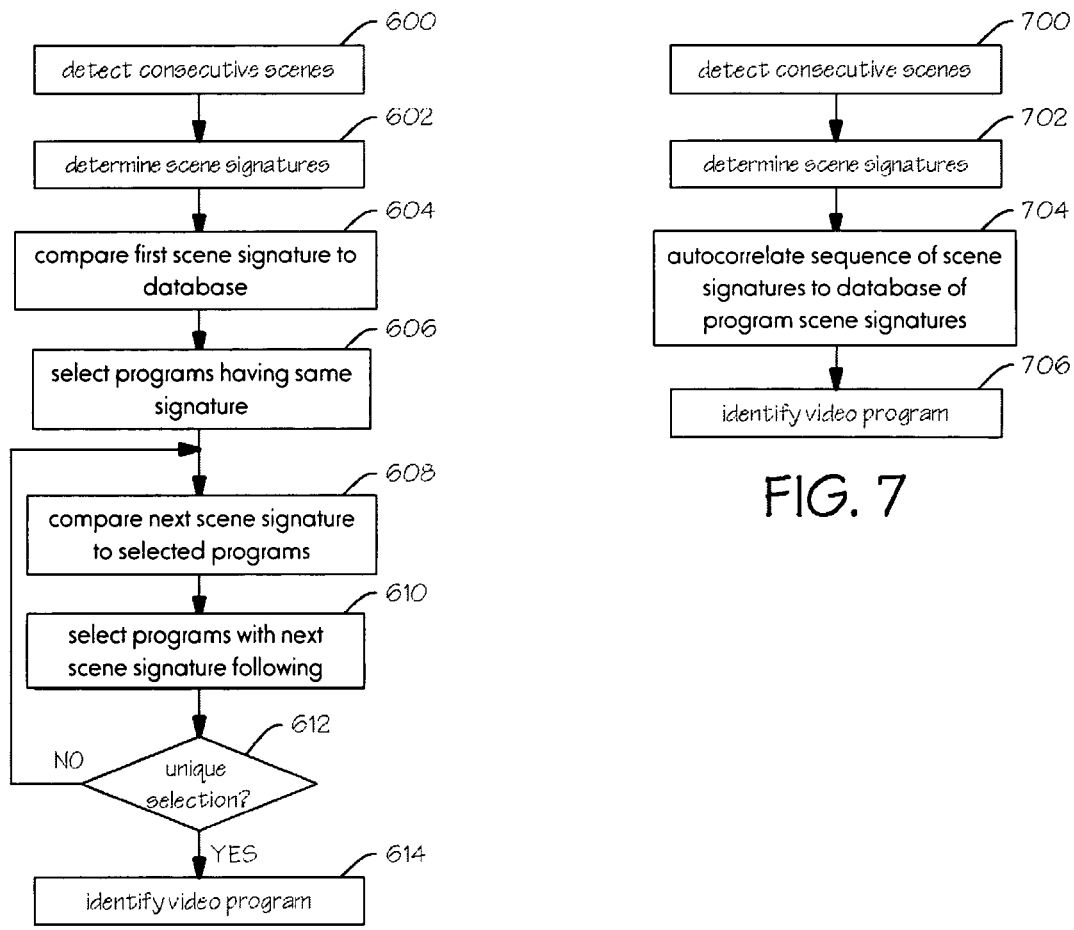
FIG. 6
FIG. 7

VIDEO SEQUENCE ID BY DECIMATED SCENE SIGNATURE

CROSS REFERENCE TO RELATED DOCUMENTS

This application is related to U.S. patent application Ser. No. 11/692,166 filed Mar. 27, 2007 entitled "Video Content Identification Using Scene Change Signatures From Downscaled Images" which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Video programs may be received by a variety of devices for display or storage. It may be desirable to display information about or related to the received video program. However, the receiving device may receive the video program as streaming compressed or decompressed content without any metadata that provides information about the content such as the title of the video program.

An example of such content delivery would be the delivery of content to a television monitor by a cable or satellite set top box. The cable set top box may provide the video content via an analog or digital signal connection that provides for the delivery of content but not provide the associated identifying data. As the cable or satellite set top box may handle interaction with the viewer to select the content, the television monitor may be completely deprived of any information about the content being displayed.

It would be useful to provide an apparatus and a method that allows a receiving device to identify the program content from the program content itself.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 5 is a flowchart of a method consistent with certain embodiments of the invention.

FIG. 6 is a flowchart of another method consistent with embodiments of the invention.

FIG. 7 is a flowchart of another method consistent with embodiments of the invention.

DETAILED DESCRIPTION

Figure 1:
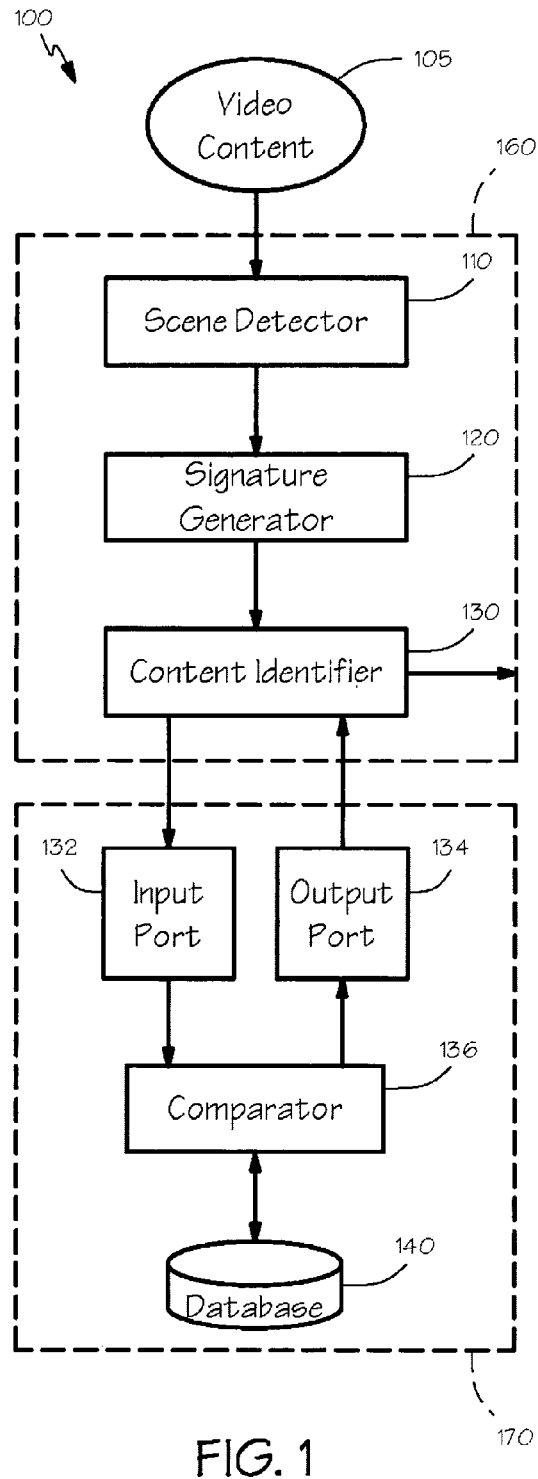
FIG. 1 is a block diagram of a device consistent with certain embodiments of the invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

FIG. 1 shows a block diagram of an apparatus 100 that may be used for identifying video content 105. A scene detector 110 receives the video content 105 to detect a plurality of consecutive scenes in the video content. The scene detector 110 may identify boundaries between scenes by any of a variety of methods. For example, boundaries of the scenes may be detected when more than a predetermined number of pixels change value. One such method is described in U.S. patent application Ser. No. 10/274,019 published as US2003/

0152224A1 to Candelore et al., entitled "Video Scene Change Detection" which is hereby incorporated by reference. Other scene change detection methods can also be used. It will be appreciated upon consideration of the present teachings that some scene changes may be difficult to detect. It should be noted that the scene detector 110 need not detect every scene change. For purposes of the present application, it may be more important that the scene detector 110 detect scenes consistently so that the same scene changes are detected each time the same video content is analyzed. It will be appreciated that minor variations in a video content may occur in different transmissions (and may even be inserted maliciously) and that the scene detector 110 may not detect scenes with perfect consistency between different transmissions.

A signature generator 120 receives the scene change indications from the scene detector 110 to determine a scene signature for each of the plurality of consecutive scenes (or other sequence of scenes). In certain embodiments, each scene change signature includes elements of a decimated image of a frame of video that immediately follows a scene change in the video content. In other embodiments, the scene change can be used as a reference point for identifying another frame of video for which the selected scene signature is generated. In any event, a particular frame of video should be able to be consistently and repeatably identified.

It is possible to identify video content using a plurality of complete images that follow a like plurality of scene changes. Pixel by pixel comparison of a specific frame to a database of specific frames requires a large amount of computing power, memory, and bandwidth considering the size of a high definition image (~1.6 gigabits per frame for a 1080i, 24 bit per pixel image). It is unwieldy to use that amount of information for identification purposes. Further, the information in a complete image may be largely redundant as much of it provides for the shading of the image rather than defining the distinctive content of the image. Reducing the amount of data used for generating a unique, or nearly unique, signature is a first step towards the reduction of bandwidth and computing power necessary to ID a piece of content. Using the term "nearly unique" it is meant to express that a single frame's signature may not be unique among all available video content, but an appropriate sequence of nearly unique signatures will, in most instances, ultimately result in unique identification of the content. Thus the image can be decimated to provide a balance between the uniqueness of a scene change signature and the amount of information included for identifying the content. It may be desirable to choose a decimating algorithm that provides a relatively uniform distribution of all possible values for the decimated image, making the decimating comparable to a hashing function for the image.

The decimating algorithm may use any of a variety of methods to reduce the amount of information in the signature as compared to the amount of information in the original image. For example, the downscaling may be determined as every mth pixel in the horizontal direction and every nth in the vertical direction, where m and n may be the same or different. It may be desirable to choose m and n as integer divisors of the original image dimensions. For example, possible values of m and n for a 1920 by 1080 image include 120, 60, 40, 30, 24, and so on. Other methods of downscaling include eliminating or reducing the precision of one or more of the chroma (UV) and/or luma (Y) values, or red, green, blue (RGB) values or any other attribute of the pixel.

In certain decimating algorithms, such as those disclosed in the above-referenced and incorporated patent application, the decimating algorithm is one which creates a downscaled image. However, this need not be the case, since other decimating algorithms may work more efficiently or provide greater options in identification if utilized. Hence, while use of a pair of integers as described above provides a "clean" downsizing, in that the integers are even devisors into the number of pixels on a row or column, it is unnecessary to actually produce a downsized image. For this reason, the term "decimation algorithm" is used to more broadly represent any algorithm that can be devised to select certain repeatably identifiable pixels from a video image that is to be identified.

Hence, one element of the decimation process involves selection of repeatably identifiable pixels in the content using any suitable algorithm. Moreover, the selection of repeatably identifiable pixels in the content need not be the same pixels for each frame, if multiple frames are decimated. Furthermore, although preferred, the selection of frames of video immediately following a scene change is also not a requirement of embodiments consistent with the present invention so long as the frame is repeatably identifiable.

A content identifier 130 receives the scene signatures from the signature generator 120 to provide the plurality of scene signatures to a comparator 136. An input port 132 may couple the content identifier 130 to the comparator 136. The comparator 136 compares the plurality of scene signatures to a database 140 having a plurality of video content items. The database 140 includes previously determined scene signatures for each video content item in the database using the same selection of repeatably identifiable pixels within one or more frames of the content. Each item of content may also include an associated time stamp for the frame or scene or scene change associated with the video item so as to provide further identifying information regarding the content.

If the comparator 136 matches the plurality of scene signatures to a sequence of previously determined scene signatures, the video content 105 is identified as being from the video content item containing the matching sequence. The identification of the video content 105 is received by the content identifier 130 from the comparator 136. An output port 132 may couple the comparator 136 to the content identifier 130. The identification of the video content may be provided by the content identifier 130 to any of a variety of related devices, such as a display unit to display the identity of the video content or to display related information or additional related content.

Matching the plurality of scene signatures to a sequence of previously determined scene signatures may or may not be by arithmetic equality. Autocorrelation may be used for the matching to provide a statistical approach that allows for variation of exact measurements in favor of a probability approach. Matching by autocorrelation may be expressed in terms of a level of confidence that the sequences of scene signatures come from the same source.

The apparatus 100 may be part of a single device such as a television monitor or a video recorder. In such embodiments, the contents of the database may be provided to the apparatus by any of a variety of means such as interleaved with the video content or by a separate link to a data provider which may be continuously or intermittently connected.

In some embodiments a first apparatus 160 and a second apparatus 170 may work cooperatively to identify video content as suggested by the dashed boxes in FIG. 1. The first apparatus 160 may generate the plurality of scene signatures and provide them to the second apparatus 170 for identification. The first apparatus 160 may be part of a device that receives video content such as a television monitor or a video recorder. The second apparatus 170 may be remote from the first apparatus 160 and may be coupled to the first apparatus by a network connection. The network connection may be shared with the connection that delivers the video content or may be an independent network connection such as an internet connection. That is, in certain embodiments consistent with the present invention, the database 140 and associated elements of 170 may be situated on the Internet at a predefined web site that can be accessed by 160 for purposes of identification of content.

Figure 2:
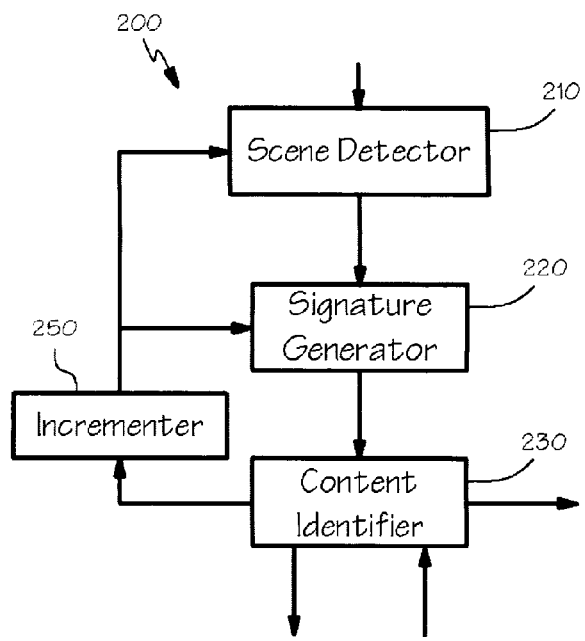
FIG. 2 is a block diagram of another device that is consistent with certain embodiments of the invention.

A sequence of scene signatures provides a "fingerprint" of the video program that can be used to identify the program. It will be appreciated that some sequences may need to be longer than others before the sequence uniquely identifies a video program in the database 140. In one embodiment as shown in FIG. 2, an incrementer 250 may receive a signal from the content identifier 130 and cause the scene detector 110 and the signature generator 120 to increase the number of consecutive scenes (or other repeatable sequence of scenes) in the sequence of detected scene signatures. The incrementer 250 may increase the number of consecutive scenes until comparing the scene signatures to the database 140 of video programs uniquely identifies the video program. The content identifier 230 may provide the signal to increase the number of consecutive scenes in response to receiving an indication that no video content was uniquely identified by the comparator 136. It is noted at this point, for clarity, that the term "scene" is used herein to refer to a self-contained episode within a larger work in theatrical, film, or TV work. A scene, when embodied as video content, is made up of a series of video or film frames. Hence, when in certain embodiments the "frame" following a scene change is selected for analysis, this is simply a convenient reference point. The selection of a first frame after the scene change is actually quite arbitrary and could instead just as easily be the second or third frame (etc.) following the scene change or any other repeatably identifiable frame in the video content. The only constraint is that the database with the pre-determined signature is generated via the same algorithm on the same frame. Generally speaking, "scene changes" are momentary dissolves, fade to black, cut to black, and other transitional effects that may delineate a) different camera angles within the broader vignette scene or b) the difference between the self-contained episode within the larger work. In the preferred embodiments, we generally use a frame following the scene change for either a) or b) as described above.

Figure 3:
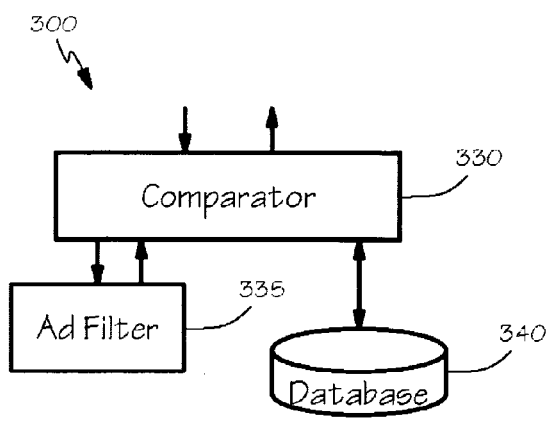
FIG. 3 is a block diagram of another device that is consistent with certain embodiments of the invention.

The video program may include inserted advertisements. In one embodiment as shown in FIG. 3, an ad filter 335 works cooperatively with the comparator 330 to identify and exclude scene signatures associated with the insertion of an advertisement. This may allow an identifiable sequence of scene signatures to be generated despite the insertion of an advertisement.

In another embodiment, the ad filter may identify and exclude scene signatures associated with the insertion of an advertisement before it is received by the comparator. In another embodiment, the ad filter may identify and exclude scene signatures associated with the insertion of an advertisement by discarding all scene change information collected and restarting the acquisition of an identifiable sequence of scene signatures when the end of the inserted commercial messages is detected.

In another embodiment, the ad filter 315 may identify and exclude scene signatures not associated with the insertion of an advertisement. This may allow an identifiable sequence of scene signatures to be generated to identify the advertisement. Identification of the advertisement may allow delivery of related content which may be video content and/or other types of content.

Figure 4A:
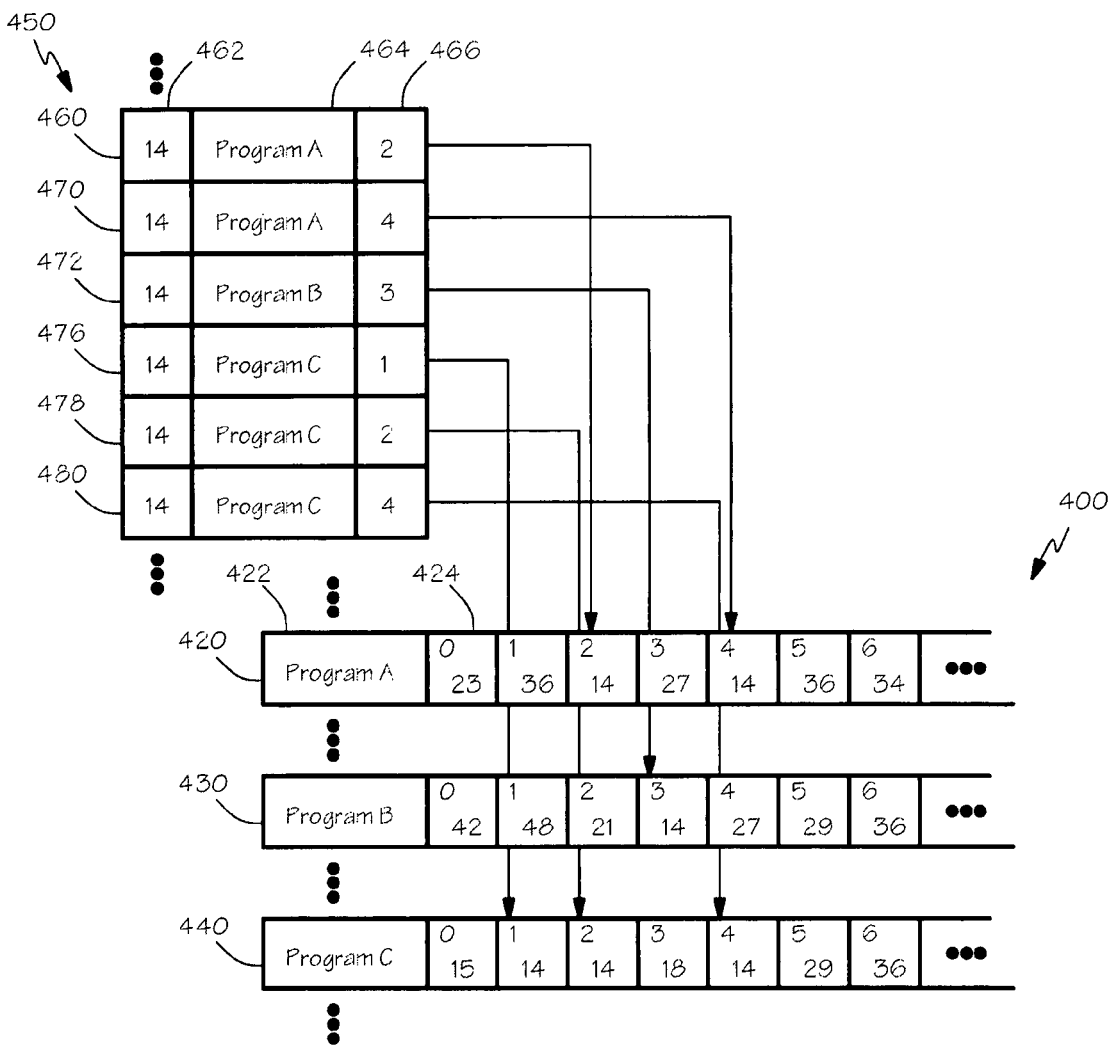
FIG. 4A is a diagram of a database structure that may be used with certain embodiments consistent with the invention.

FIG. 4A illustrates a database structure that may be used to identify a video program from a sequence of scene signatures. The database structure may provide a table 400 of program entries 420, 430, 440. Each program entry 420 may include program identification data 422 and a sequence of scene signatures 424 for the identified program. The database structure may further provide an index 450 of scene signatures to identify scenes in programs having a given scene signature. An entry 460 in the index 450 may include an indexed scene signature 462, a program pointer 464, and a scene offset 466. The entries in the index may be sorted by the indexed scene signature 462. In the most straightforward embodiment, this database includes a scene signature characterized by a signature for the first frame immediately following detection of a scene change as detected by a particular scene change detection algorithm. However, this should not be considered limiting, since signatures can be devised for any suitable sequence of frames.

At this point is should be recognized that the term "scene signature" as used herein is actually a signature created by decimating a particular frame or collection of frames within a scene, and is used to characterize that scene in an abbreviated way. Hence a scene signature may in fact be a signature created by decimating a first frame after a scene change, or may be one or more of a sequence of frames selected in a repeatable way from within the content that are decimated to represent one or more scenes. Hence, a scene signature may be a single decimated frame (e.g., a single pre-determined sequence numbered frame) following a scene change which forms a signature of an associated collection of frames in the scene. Each such scene signature in a sequence of scene signatures is a separated by one (or possibly more than one if desired) scene changes.

The comparator 130 may include a first search engine (or first instance or application of a search engine) that uses the index 450 to identify a first plurality of scenes from video programs in the database 400 based on the first scene signature. As illustrated by FIG. 4A, if the first scene signature in a sequence of scene signatures is 14, the index 450 provides pointers to six scenes in three video programs:

| | |
|---|---|
| Program A, | scene 2 |
| Program A, | scene 4 |
| Program B, | scene 3 |
| Program C, | scene 1 |
| Program C, | scene 2 |
| Program C, | scene 4 |

Figure 4B:
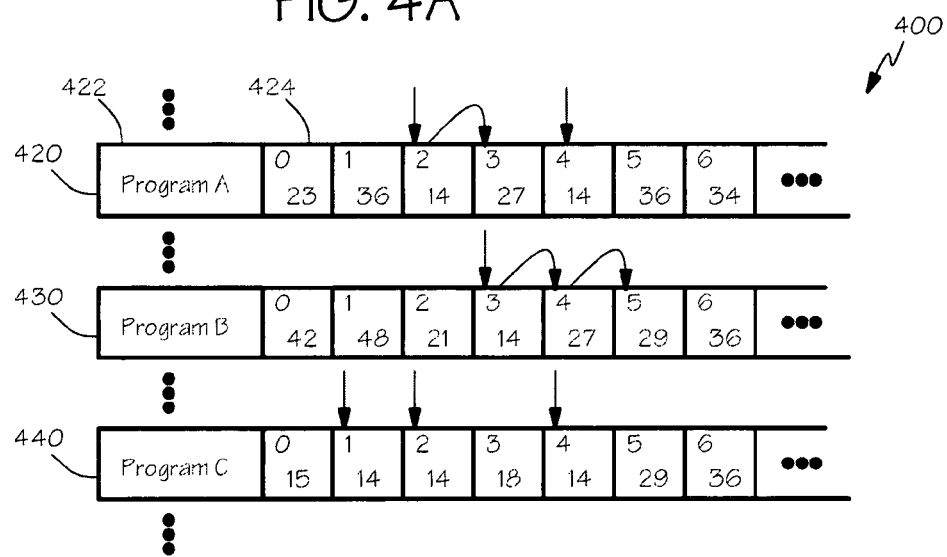
FIG. 4B is a diagram of a portion of the database structure illustrating another aspect of its use in a manner consistent with embodiments of the invention.

The comparator may further include a second search engine to compare a second scene signature for a consecutively following scene (consecutive being defined as a second scene used in the algorithm, and not to imply necessity for an immediately following scene change) for each of the identified plurality of video content from the database. As shown in FIG. 4B, if the second scene signature for the second scene is 27, the second search engine identifies Program A, scene 3 and Program B, scene 3 as matches from the group identified by the first search engine. The sequence of scene signatures 424 for each program entry 420 may be ordered consecutively to facilitate retrieval of the second scenes for comparison. Alternatively, the scene signatures may be ordered by value to facilitate operation of a search engine seeking a particular value.

The comparator may use the second search engine to compare successive scene signatures for consecutively following scenes for each of the plurality of video content from the database identified by the preceding scene signature. Successive scenes may be compared until a unique video content is identified and/or until all provided scene signatures have been compared. In one embodiment, scene signature comparison continues even after a unique video content is identified to confirm the identification. If comparison of the provided scene signatures does not identify a unique video content, an indication that no video content was uniquely identified by the comparator 136 may be provided. It is also noted that multiple search engines or multiple instances of a search engine may be utilized equivalently.

As shown in FIG. 4B, if the third scene signature for the third scene is 29, the third search engine identifies Program B, scene 4 as a unique match from the group identified by the second search engine. Program B would be identified based on the scene signature sequence of 14, 27, and 29. The program identification may be displayed to a user, stored in a location for use by other devices, transmitted to a device for use, or otherwise put into a tangible form for use.

If the third scene signature for the third scene was 36, then there is no matching sequence and the indication that no video content was uniquely identified by the comparator 136 may be provided. If only two scene signatures were provided in this example, 14 and 27, then there would be two matching sequences and the indication that no video content was uniquely identified by the comparator 136 could be provided. It will be appreciated that the indication that no video content was uniquely identified might further indicate whether there were no matching sequences or more than one matching sequence. The following illustrates the value of correlation algorithm techniques over exact match methodology in terms of identifying content. Broadcasters may use more compression or even a different compression algorithm on the content then was used to obtain the signatures stored for purposes of comparison. As virtually all commercially used compression algorithms are lossy, an exact signature match is unlikely, but a series of successful "almost matches" would enable identification of the program with a high degree of probability.

The viewer could even be queried if they are watching a particular program if the match lacks sufficient certainty.) The indication might be the number of matching sequences found. The mechanism 200 shown in FIG. 2 for increasing the number of scenes detected may be responsive to the number of matching sequences found and provide a greater increase in scenes detected when the number of matching sequences found is large.

If the sequence of scene signatures 424 for each program entry 420 are ordered consecutively and data are included in the database 400 that indicates the temporal position of each scene signature 424 in the identified program 422, then the matching of the sequence of scene signatures may substantially identify the temporal position in the video content. The output port 134 in FIG. 1 may provide information related to the temporal position of the plurality of scene signatures within the plurality of previously determined scene signatures for the identified video content. In some embodiments, the identity of the video content may be known and provided with the plurality of scene signatures so that the comparator only compares the provided scene signatures to the entry for the identified video content. For example, the video content may have been previously identified and the scene signatures may be provided to validate the temporal position.

Autocorrelation techniques may be used to determine if a sample of scene signatures from the received video program is from a given video program. The comparator may include a digital signal processor to compute the autocorrelation between a sequence of scene signatures for the plurality of consecutive scenes and a sequence of previously determined scene signatures for each video program in the database to identify the video program.

The comparator may use autocorrelation to compute a degree of confidence (threshold) for a comparison between a scene signature to be identified and a previously determined scene signature. The result may be similar with a specific "confidence factor," which may be expressed as a difference between the two signatures. For example, the difference between the signatures may be determined as a sum of the squares of the differences between corresponding pixels in the two signatures. Comparison of successive scene signatures may increase the confidence of a match if the successive comparisons continue to be similar with a specific "confidence factor."

It is possible that the sequence of scene signatures may fail to match any sequence of scene signatures 424 in the database 400. The failure to match may be the result of trying to identify a program that is not in the database or the result of some error in the generation of the sequence of scene signatures. A matching failure may initiate the generation of a new sequence of scene signatures to retry identification of the video program.

FIG. 5 is a flowchart for one embodiment of a method of identifying a video program that embodies the invention. A plurality of consecutive scenes in the video program is detected at 500. Consecutive scenes should be interpreted to mean any pre-defined sequence of scenes. The boundaries of the scenes may be detected when more than a predetermined number of pixels change value, for example. In some embodiments, scenes associated with advertisements are identified and excluded from the detected plurality of consecutive scenes in the video program. In other embodiments, the advertisements themselves are considered targets for identification. By knowing when an ad is playing, it is possible to obtain metadata for that advertisement.

A scene signature for each of the plurality of consecutive scenes is determined at 502. The scene signatures may be determined by selecting a repeatable set of pixels to represent a known frame in the image, such as the frame that immediately follows a scene change (i.e., the first frame of the new scene). The scene signatures are compared to a database of video programs that includes previously determined scene signatures for each video program in the database 504. If there is a unique match between the detected scene signatures and a sequence of previously determined scene signatures for a video program 506-Yes, that video program is identified by the detected scene signatures 510.

In some embodiments, a single device, such as a television monitor or a video recorder, performs the entire method. In other embodiments, two devices may work cooperatively to perform the method. The first device may detect the scenes 502 and determine the plurality of scene signatures 504 and provide them to the second device for identification 504, 506. The first device may be a device that receives video content such as a television monitor or a video recorder. The second device may be remote from the first device and may be coupled to the first apparatus by a network connection such as a cable television network or the Internet. The network connection may be shared with the connection that delivers the video content or may be an independent network connection such as an Internet connection.

In some embodiments, the comparison may be based on the sum of the squares of the differences (SSOD) between corresponding pixels in the detected scene signature and the predetermined scene signature. A match may be detected if the SSOD is below a predetermined threshold for each of the detected scene signatures.

In some embodiments, if scene signature comparison does not uniquely match a video program 506-No, the number of consecutive scenes to detect is increased 508, and the method is repeated until comparing the scene signatures to the database of video programs 506 uniquely identifies the video program 510 for example by exceeding a prescribed threshold of confidence resulting from a correlation or autocorrelation calculation.

FIG. 6 is a flowchart for another method of identifying a video program that embodies the invention. A plurality of consecutive scenes in the video program is detected 600. A scene signature for each of the plurality of consecutive scenes is determined 602. A scene signature for a first scene is compared to the database of video programs using a first index that is sorted by scene signatures 604 to identify a first plurality of video programs in the database 606.

A scene signature for a scene that consecutively follows is compared to the predetermined scene signature that follows the scene that was used to select video programs from the database 608. Predetermined scene signatures for video programs may be stored in consecutive order in the database. The video programs that match are selected as a subset of the previously selected video programs 610. Successive scene signatures are compared to further select video programs from the previously selected video programs 612-No until a video program is uniquely identified 612-Yes, 614. Again, correlation between the signatures can be used to determine that a likelihood of having identified a match exceeds a prescribed threshold of confidence.

FIG. 7 is a flowchart for another method of identifying a video program that embodies the invention. A plurality of consecutive scenes, or other sequence of scenes in the video program are detected 700. A scene signature for each of the plurality of consecutive scenes is determined 702. Autocorrelation between a sequence of scene signatures for the plurality of consecutive scenes and a sequence of previously determined scene signatures for each video program in a database is tested at 704. The video program having the greatest autocorrelation is identified as the source of the detected consecutive scenes at 706. A digital signal processor may be used to test for autocorrelation between the sequence of scene signatures for the plurality of consecutive scenes and the sequence of previously determined scene signatures for each video program in the database.

The sequence of scene signatures for each program entry may be ordered consecutively and may include the temporal position of each scene signature in the identified program. Matching of the sequence of scene signatures may substantially identify the temporal position in the video content. Information related to the temporal position of the plurality of scene signatures in the identified video content may be provided. In some embodiments, the identity of the video content may be known and provided with the plurality of scene signatures to determine the temporal position within the given video content. For example, the video content may have been previously identified and the scene signatures may be provided only to obtain an updated temporal position.

In accordance with certain embodiments consistent with the present invention, a scene may be decimated by using any selection of repeatably identifiable pixels in a particular scene. Those pixels may advantageously not be the same selection of pixels used for other scenes. Moreover, the pixel data may be truncated so that only, for example, the three or four (or more or less) most significant bits of the pixel is used to create the fingerprint. So, by way of simplified illustrative example and by no means limitation, a scenario may be devised wherein for generation of a first frame's signature, a selection of pixels is chosen according to the following table, wherein the first frame in this example is a first frame following a first identified scene change. In this table, the two character index ij, is used to designate a row and column of pixels in an array of, for example, 1920 by 1080 pixel frame. In this example, for the sake of brevity in the illustration, only four pixels are chosen and assumed to have 16 bit luminance values which are truncated to 4 bits, however, it will be understood that it is likely that many more pixels should be chosen to establish a good compromise between the quantity of data and the accuracy of the signature.

| Pixel | Luminance value | 4 MSB |
|---|---|---|
| 43, 64 | 0001010111101101 | 0001 |
| 136, 78 | 1001010010010100 | 1001 |
| 469, 207 | 0110100010000011 | 0110 |
| 800, 586 | 0101000100101110 | 0101 |

Using this simple example, one signature of the frame could be established as a 16 bit word made up of the four luminance value's 16 MSBs concatenated together as follows: first frame signature=0001100101100101.

A second frame signature can be similarly established as a selection of bits from the first frame after the next scene change as follows:

| Pixel | Luminance value | 4 MSB |
|---|---|---|
| 239, 809 | 0011010110001100 | 0011 |
| 499, 782 | 1011010010110100 | 1011 |
| 1277, 720 | 1110100000100011 | 1110 |
| 1514, 58 | 1101100110101111 | 1101 |

Again, using this simple example, one signature of the second frame could thus be established as a 16 bit word made up of the four luminance value's 16 MSBs concatenated together as follows: second frame signature=0011101111101101.

This process can be repeated for each of a sequence of frames, such as the sequence of frames representing the first frame after a scene change, for each scene or for a suitable quantity of scenes in the video information. As noted above, although this example used truncated 16 bit luminance values, other signatures can be devised using any characteristic of the pixel that can be represented and may or may not be truncated. In the example shown, truncated luminance values are used, but in other color space definitions, other components, truncated versions of the color space components or other characteristics of the pixel can be used. As is known in the art, any number of color space definitions can be applied to represent pixels forming a frame of an image. Such known color spaces include RGB color space, Luminance-Chrominance color space and other color space representations. Luminance-Chrominance color spaces are comprised of an achromatic (gray) luminance component and two chrominance components, which are orthogonal to the achromatic component such as YUV/YCbCr and opponent color spaces. Generally, any feature of the pixel can be used to establish the signature used in connection with embodiments consistent with the present invention.

While the above example uses two or more 16 bit words constructed by truncating pixel data and concatenating the data for four pixels per frame, it is to be understood that this method is merely presented by way of illustration. Some amount of experimentation will be required to determine an appropriate number of pixels per frame, the amount of data to be extracted from each pixel, optimum type of data, and number of frames so that the content identification can be reliably made. It is expected that 144 pixels per frame represented by 8 bits each over a single frame is a reasonable starting point for such experimentation to uniquely identify a specific element of video content from among a collection of thousands of segments of video content. Moreover, the type of data from each pixel selected may be significant. For example, rather than selection of only luminance data, selection of the most significant bits of luminance and chrominance may provide more accurate characterization of the content. Regardless, such data can be concatenated to produce a signature that can be analyzed in the manner described. Such routine experimentation is within the ordinary skill in the art after consideration of the present teachings. Concatenation is but one method of creating a signature based upon pixel bits. XORing data together can also be used to generate a "signature". (Note: Decimation reduces the amount of data to operate upon. Thus, take the remaining pixels and determine how many bits to use such as using the four MSB from each R, G, & B (or Y, Cr, & Cb) to create a new 12 bit word. Each 12-bit word could be XORed to generate a final "signature" for the frame. This result can then be used for comparison to a database. By reducing the amount of data to operate upon in the early stages by employing simple techniques, local required processing power, memory bandwidth, and memory requirements are minimized thereby optimizing the process to provide minimal network loading and while enhancing the server response time.)

It is to be appreciated by one skilled in the art upon consideration of the present teachings that each frame need not be characterized by an identical number of pixels. For example, if 100 pixels are used to characterize a first frame, this may dramatically reduce the number of candidate matches such that subsequent frames may only use, for example, 20 pixels in order to more distinctly characterize the content. Any number of variations is possible, and the process may be optimized by experimentation.

Once a suitable signature has been devised for a plurality of frames, this data can be placed into a database for comparison against signatures of content computed from similar values in the actual content being displayed, and used as described above. The pixel selection, as previously noted need not be a systematic selection that results from downscaling of the image, but may be any repeatable systematic pixel selection that can be consistently applied to establish a signature for both the content being analyzed and to the content stored in the database.

Hence, an unknown video clip with multiple scene changes can be identified by creating a signature based upon a decimated image and compared with signatures created with the same decimation algorithm for repeatably identifiable scenes such as those immediately following scene changes. By using scene change detection a video frames can be selected accurately and repeatedly for this method. In the case of HD material this frame is over 2 megapixels (or greater than 48 Mbits). Since this is a lot of data to process or move, using a decimation algorithm the picture size can be significantly reduced, for example: a 1920×1080 decimated by using only $1/20^{th}$ of the pixels yields: 96×54 or 5184 pixels or 124 kbits; using $1/40^{th}$ of the pixels yields 48×27 or 1296 pixels or 31 kbits; or using every $1/120^{th}$ of the pixels yields 16×9 or 144 pixels or 3456 bits. These are much smaller numbers that are easily generated, manipulated and sent (to a server) for comparison to a database for possible matches. Clearly, the smaller the number, the easier the manipulation. This is to be balanced against the amount of data needed for a good identification. By decimating in a manner that selects pixels from all over the screen the likelihood of manipulation of the content to throw off this method is likely to be reduced. Comparison to a database will likely result in a correlation number. By comparing successive scene change video frames, the confidence factor for the correlation (if less than exact) will increase such that very few correlations may need to be run.

Thus, a method for identifying video content consistent with certain embodiments involves, selecting a plurality pixels using a pixel selection algorithm, the pixels being selected to provide a repeatable selection of pixels in a selected frame in the video content; establishing a scene signature by: extracting a characteristic of each selected pixel that can be represented in a digital form for each pixel, and generating a digital stream by concatenating the digital form for the extracted characteristic of each pixel; transmitting the scene signature to an identification device for comparison with scene signatures in a database having a plurality of video content items to identify the video content; and receiving either the identification of the video content or an indication that no video content is uniquely identified by the scene signature. In certain embodiments, the process further involves repeating the selecting, establishing and transmitting for a plurality of pixels repeatably selected from another selected frame in the video content. In certain embodiments, the repeating is carried out in response to receiving the indication that no video content is uniquely identified by the scene signature. In certain embodiments, the repeatably selected frames of video content can be frames immediately following a scene change. In certain embodiments, the extracted characteristic of each pixel comprises a truncated digital representation of a pixel characteristic. In certain embodiments, the truncation comprises selecting a plurality of most significant bits.

In certain embodiments, an apparatus for identifying video content has an input port to receive a plurality of consecutive scene signatures, each scene signature being made up of data extracted from a selection of repeatably identifiable pixels selected from a repeatably selected frame of the video content. A comparator determines an identification of the video content by matching the plurality of consecutive scene signatures to a database having a plurality of video content items, the database including previously determined scene signatures made up of data extracted from the selection of repeatably selected frames of the video content in the database. An output port provides the identification of the video content from the comparator.

In another embodiment, an apparatus for identifying video content a scene detector to detect a repeatable sequence of frames in the video content. A signature generator determines a scene signature for each of the plurality of scenes, each scene signature including a repeatable selection of pixels in the repeatable sequence of frames in the video content; and a content identifier: to provide a plurality of scene signatures to a comparator that compares the plurality of scene signatures to a database having a plurality of video content items, the database including previously determined scene signatures for each item of video content in the database, and to receive an identification of the video content from the comparator.

In another embodiment, a method for identifying video content involves receiving a plurality of scene signatures, each scene signature including a repeatable selection of pixels in a repeatable sequence of frames in the video content in the video content; determining an identification of the video content by matching the plurality of scene signatures to a database having a plurality of video content items, the database including previously determined scene signatures for each repeatable sequence of frames for each item of video content in the database, and providing the identification of the video content.

Embodiments consistent with the invention described herein may be embodied in specific hardware components that contain hardwired logic for performing the operations. Alternatively, program instructions may be used to cause a functional change in a general-purpose or special-purpose processing system that is programmed with the instructions, or any combination of programmed computer components and custom hardware components, to perform functions that embody the invention.

Embodiments consistent with the invention described herein may be embodied in an article of manufacture that provides information in a form readable by a computer. The term "computer" as used in this description is intended to include any device or machine whose function can be altered by the receipt of information. Computers include, but are not limited to, central processing units, processors, controllers, and programmable arrays. When read by a computer, the information provided by the article of manufacture causes a functional change in the computer such that the computer performs functions and produces tangible results as determined by the information. The article of manufacture or the information it provides may be referred to as software, firmware, program, procedure, process, application, logic, and so on. Software, or any equivalent term, may be said to perform a function or produce a result meaning that when a computer reads the information that represents the software, the functional change in the computer causes the computer to perform a function or produce a result.

In certain embodiments consistent with the present invention, apparatus for identifying video content includes a scene detector to detect a plurality of consecutive scenes in the video content. The video content may include a video program and an advertisement contained within the video program. A signature generator determines a scene signature for each of the plurality of consecutive scenes. A content identifier provides the plurality of scene signatures to a comparator that compares the plurality of scene signatures to a database having a plurality of video content items to identify the video program. The database includes an ordered plurality of previously determined scene signatures for each item of video content in the database. The content identifier receives an identification of the video content from the comparator. The content identifier may further receive information related to a position of the plurality of scene signatures within the ordered plurality of previously determined scene signatures.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. An apparatus for identifying video content, the apparatus comprising:
   a scene change detector to detect scene changes to thereby identify a plurality of repeatably detectable scenes;
   a scene signature generator configured to generate a plurality of scene signatures, one for each of the plurality of scenes, each scene signature being made up of concatenated pixel data extracted from a selection of repeatably identifiable pixels selected from a repeatably selected frame of the video content, where each selection of pixels represents a subset of less than all pixels in the frame from which the pixels are selected, and where the pixel data includes a truncated segment of pixel data;
   an input to receive the plurality of scene signatures;
   a comparator that determines an identification of the video content by matching the plurality of scene signatures to a database having a plurality of video content items, the database including previously determined scene signatures made up of data extracted from the selection of repeatably selected frames of the video content in the database, and
   an output port to provide the identification of the video content from the comparator;
   wherein the repeatably selected frames are predetermined frames following scene changes, and each of the frames has the same temporal position after the occurrence of its related scene change.

2. The apparatus of claim 1, where the video content includes a video program and an advertisement contained within the video program, the apparatus further comprising an ad filter to identify and exclude scene signatures associated with the advertisement from the plurality of scene signatures compared to the database such that the plurality of scene signatures compared is from the video program and the identification of the video content is an identification of the video program.

3. The apparatus of claim 1, where the video content includes a video program and an advertisement contained within the video program, the apparatus further comprising an ad filter to identify and exclude scene signatures associated with the video program from the plurality of scene signatures compared to the database such that the plurality of scene signatures compared is from the advertisement and the identification of the video content is an identification of the advertisement.

4. The apparatus of claim 1, where the previously determined scene signatures for each item of video content in the database are arranged in either a temporally consecutive order or in an order based upon value and the output port further provides information related to a temporal position of the plurality of scene signatures within the plurality of previously determined scene signatures for the identified video content.

5. The apparatus according to claim 1, where each item of video content in the database has an associated time stamp.

6. The apparatus of claim 1, where the comparator further comprises:
   a first search engine to compare a first scene signature from the plurality of consecutive scene signatures to the database using a first index that is sorted by scene signature values to select a first plurality of video content in the database; and
   a second search engine to compare a second scene signature for a consecutively following scene for each of the identified plurality of video content from the database to select a second plurality of video content from the previously selected plurality of video content until a single video content is uniquely selected.

7. The apparatus of claim 5, where the output port further provides an indication if no video content is uniquely identified by the plurality of scene signatures.

8. The apparatus of claim 1, where the comparator includes a digital signal processor to test for autocorrelation between a sequence of scene signatures for the plurality of consecutive scenes and a sequence of previously determined scene signatures for each item of video content in the database.

9. The apparatus of claim 1, where the repeatably selected frames of video content comprise a repeatably selectable frame following a scene change.

10. An apparatus for identifying video content, the apparatus comprising:
    a scene detector to detect a plurality of repeatably detectable scenes in the video content;
    a signature generator to determine a scene signature for each of the plurality of scenes, each scene signature including concatenated pixel data from a repeatable selection of pixels in a repeatably selected frame in the video content, where the selection of pixels represent a subset of less than all pixels in the frame, and where the pixel data includes a truncated segment of pixel data; and
    a content identifier
    to provide a plurality of scene signatures to a comparator that compares the plurality of scene signatures to a database having a plurality of video content items, the database including previously determined scene signatures for each item of video content in the database, and
    to receive an identification of the video content from the comparator; wherein the repeatably selected frames are predetermined frames following scene changes, and each of the frames has the same temporal position after the occurrence of its related scene change.

11. The apparatus of claim 10, further comprising an incrementer to increase a number of scenes in the plurality of scenes if the content identifier does not receive the identification of the video content from the comparator.

12. The apparatus of claim 10, where the video content includes a video program and an advertisement contained within the video program, the apparatus further comprising an ad filter to identify and exclude scene signatures associated with the advertisement from the plurality of scene signatures compared to the database such that the plurality of scene signatures compared is from the video program and the identification of the video content is an identification of the video program.

13. The apparatus of claim 10, where the video content includes a video program and an advertisement contained within the video program, the apparatus further comprising an ad filter to identify and exclude scene signatures associated with the video program from the plurality of scene signatures compared to the database such that the plurality of scene signatures compared is from the advertisement and the identification of the video content is an identification of the advertisement.

14. The apparatus of claim 10, where the content identifier further receives information related to a temporal position of the plurality of scene signatures within the plurality of previously determined scene signatures for the identified video content.

15. The apparatus of claim 10, where the repeatably selected frames of video content comprise frames immediately following a scene change.

16. A method for identifying video content, the method comprising:
    receiving a plurality of scene signatures, each scene signature including concatenated pixel data from a repeatable selection of pixels in a repeatably selected frame in the video content in the video content, where each selection of pixels represents a subset of less than all pixels in the frame from which the pixels are selected, and where the pixel data includes a truncated segment of pixel data;
    determining an identification of the video content by matching the plurality of scene signatures to a database having a plurality of video content items, the database including previously determined scene signatures for each repeatable sequence of frames for each item of video content in the database, and
    providing the identification of the video content;
    wherein the repeatably selected frames are predetermined frames following scene changes, and each of the frames has the same temporal position after the occurrence of its related scene change.

17. The method of claim 16, where the video content includes a video program and an advertisement contained within the video program, the method further comprising ad filtering to identify and exclude scene signatures associated with the advertisement from the plurality of scene signatures compared to the database such that the plurality of scene signatures compared is from the video program and the identification of the video content is an identification of the video program.

18. The method of claim 16, where the video content includes a video program and an advertisement contained within the video program, the method further comprising ad filtering to identify and exclude scene signatures associated with the video program from the plurality of scene signatures compared to the database such that the plurality of scene signatures compared is from the advertisement and the identification of the video content is an identification of the advertisement.

19. The method of claim 16, where the previously determined scene signatures for each scene change of each item of video content in the database are arranged in either a temporally consecutive order or in an order based upon value and the output port further provides information related to a temporal position of the plurality of scene signatures within the plurality of previously determined scene signatures for the identified video content.

20. The method according to claim 16, where each item of video content in the database has an associated time stamp.

21. The method of claim 16, where the comparing further comprises:
    comparing a first scene signature from the plurality of scene signatures to the database using a first index that is sorted by scene signature values to select a first plurality of video content in the database; and
    comparing a second scene signature for a following scene for each of the identified plurality of video content from the database to select a second plurality of video content from the previously selected plurality of video content until a single video content is uniquely selected.

22. The method of claim 21 further comprising providing an indication if no video content is uniquely identified by the plurality of consecutive scene signatures.

23. The method of claim 21, where the comparing includes using a digital signal processor to test for autocorrelation between a sequence of scene signatures for the plurality of scenes and a sequence of previously determined scene signatures for each item of video content in the database.

24. The method of claim 16, where the repeatably selected frames of video content comprise frames immediately following a scene change.

25. The method of claim 16, where the scene signatures are produced by:
    selecting a plurality pixels using a pixel selection algorithm, the pixels being selected to provide a repeatable selection of pixels in a selected frame in the video content; and
    establishing a scene signature by:
        extracting a characteristic of each selected pixel that can be represented in a digital form for each pixel,
        truncating the digital form for each pixel, and
        generating a digital stream by concatenating the truncated digital forms for the extracted characteristic of each pixel.

26. A non-transitory computer readable storage medium storing instructions which, when executed on a programmed processor, carry out the method according to claim 16.

27. A method for identifying video content, the method comprising:
    identifying a scene in the video content;
    identifying a repeatably selected frame in the scene;
    selecting a plurality pixels in the selected frame using a pixel selection algorithm, the pixels being selected to provide a repeatable selection of pixels in the video content, where the repeatable selection of pixels represents a subset of less than all pixels in the selected frame, and where the pixel data either includes truncated pixel data or eliminates certain pixel data;
    establishing a scene signature by:
        extracting a characteristic of each selected pixel that can be represented in a digital form as pixel data for each pixel, truncating the digital form for each pixel, and generating a digital stream by concatenating the digital forms for the extracted characteristic of each pixel;
    transmitting the scene signature to an identification device for comparison with scene signatures in a database having a plurality of video content items to identify the video content; and
    receiving either the identification of the video content or an indication that no video content is uniquely identified by the scene signature;
    wherein the repeatably selected frames are predetermined frames following scene changes, and each of the frames has the same temporal position after the occurrence of its related scene change.

28. The method of claim 27, further comprising repeating the selecting, establishing and transmitting for a plurality of pixels repeatably selected from another selected frame in the video content.

29. The method of claim 28, where the repeating is carried out in response to receiving the indication that no video content is uniquely identified by the scene signature.

30. The method of claim 27, where the repeatably selected frames of video content comprise frames immediately following a scene change.

31. The method of claim 27, where the truncation comprises selecting a plurality of most significant bits.

32. A non-transitory computer readable storage medium storing instructions which, when executed on a programmed processor, carry out the method according to claim 27.

* * * * *